United States Patent [19]

Stagner

[11] Patent Number: 4,614,354
[45] Date of Patent: Sep. 30, 1986

[54] MULTI-INTERCHANGEABLE TOW BAR

[76] Inventor: Irvin D. Stagner, 1814 Ellis, Wichita, Kans. 67211

[21] Appl. No.: 716,366

[22] Filed: Mar. 26, 1985

Related U.S. Application Data

[63] Continuation of Ser. No. 499,438, May 31, 1983, abandoned.

[51] Int. Cl.[4] .............................................. B60D 1/14
[52] U.S. Cl. .................. 280/415 R; 280/457; 280/491 D
[58] Field of Search .......... 280/491 R, 491 C, 491 D, 280/491 E, 495, 415 R, 505, 502, 500, 415 A, 457

[56] References Cited

U.S. PATENT DOCUMENTS

| | | | |
|---|---|---|---|
| 2,529,686 | 11/1950 | Green | 280/502 |
| 3,072,419 | 1/1963 | Safford | 280/502 X |
| 3,427,045 | 2/1969 | Hoock | 280/491 D |
| 3,649,049 | 3/1972 | Woodke | 280/502 |
| 3,806,162 | 4/1974 | Milner | 280/491 R |
| 3,817,558 | 6/1974 | Eger | 280/491 D |
| 3,938,830 | 2/1976 | Lane | 280/491 R |
| 3,947,062 | 3/1976 | Pierce | 280/491 D |
| 4,022,489 | 5/1977 | Shattles et al. | 280/491 E |
| 4,266,800 | 5/1981 | Hawkins | 280/502 |

FOREIGN PATENT DOCUMENTS

| | | | |
|---|---|---|---|
| 500110 | 3/1920 | France | 280/491 E |
| 806862 | 7/1935 | France | 280/491 E |

*Primary Examiner*—John A. Pekar

[57] ABSTRACT

A tow bar that is adaptable to fit a large variety of different vehicles. A basic tow bar that interchanges connector assemblies, by a choice of various separate components that are attachable, so this basic tow bar is easily converted to different types of tow bars.

1 Claim, 21 Drawing Figures

MULTI-INTERCHANGEABLE TOW BAR

CROSS REFERENCE TO RELATED APPLICATIONS

This application is a continuation of Ser. No. 499,438 filed May 31, 1983, now abandoned, which is a substitute for Ser. No. 147,636 filed May 7, 1980, now abandoned.

BACKGROUND OF THE INVENTION

1. Field of the Invention

This invention relates to tow bars that are used for the purpose of towing a vehicle behind another vehicle to maintain proper distance and control over said vehicles.

More particularly to a multi-interchangeable tow bar that has a basic tow bar, comprising a center bar, with a coupler on the front end thereof, two center plates welded to said center bar, one upper and one lower, producing a yoke, two arms fitted in said yoke, pivotal for adaptation to said vehicle; at the rear end of each arm are attaching holes for the purpose of attaching or detaching a number of selective component parts, which allows for two type of tow bars, furthermore, said tow bar has, two safety bars, as well as, a chain, that allows a choice of uses.

However, the basic multi-interchangeable tow bar does not include any of said selective component parts attachable to said arms in a permanently attached manner. To attain a complete tow bar, said selective component parts are chosen and assembled according to the need which varies from vehicle to vehicle, due to vehicle design changes. Furthermore said basic tow bar is adaptable to an unlimited number of vehicles, such as, automobiles, airplanes, tanks, tractor or any vehicle to be towed.

Two types of tow bars are obtained in this invention are:

(a.) Included in this type of tow bar is said basic tow bar and the following selective component parts attached to each of said basic tow bar arms; a interchangeable swivel brace, upper and lower jaws, two safety bars, to assemble said basic bar into a complete tow bar that clamps onto a vehicle's bumper to be towed, additionally there is a set of alternate upper jaws which may be used; whereas, this type of tow bar is clamp onto bumper type.

(b.) Included in this type of tow bar is said basic tow bar and the following selective component parts attached to each of said basic tow bar arms; a interchangeable swivel brace, with a flat vertical face, and changeable plates, assembled together and attached to said basic tow bar arms. Also, two safety bars, a center brace, a draw chain tightening hook, assembled and attached to the center bar of said basic tow bar, moreover, a draw chain used to secure said completed tow bar to the frame of said vehicle to be towed, as this kind of tow bar abuts up against the bumper of said vehicle to be towed: whereas, this type of tow bar is abutment to bumper type.

Bolts, washers, and nuts are used to connect most parts together in both types of tow bars.

2. Description of Prior Art

There are numerous types of tow bars, that are designed to tow one vehicle behind another. A number of these are as follows:

| | |
|---|---|
| Eger | 3,817,558 |
| Lane | 3,938,830 |
| Milner | 3,806,162 |
| Hoock | 3,427,045 |
| Pierce | 3,947,062 |
| Safford | 3,072,419 |
| Shattles et al | 4,022,489 |
| Woodke | 3,649,049 |
| Hawkins | 4,266,800 |
| Blachon (France) | 806,862 |
| Green | 2,529,686 |
| Labourdette (France) | 500,110 |

Tow bars are primarily of a basic design from the front coupler through a yoke longitudinal pivotal arms to their attaching holes for assemblies or welded assembles that make contact with the vehicles to be towed. While, there is some differences between said coupler and rear end of said pivotal arms, most design difference is based on what type of requirements are needed to attach a basic tow bar to a vehicle that is to be towed.

Design differences of vehicles that are towed has been the factor that has brought about a need for different designed assemblies connecting tow bar arms and each towed vehicle.

This design difference will become more apparent through each reference of the following prior art.

Eger's patent has a hitch portion that couples Eger's tow bar to a towing vehicle; said tow bar has a center bar held by a tubular member serving as a yoke for tow bar arms, wherein, there is on the rear end of said arms is a collar to hold a support rod, which serves as the assembly that attaches said tow bar to the vehicle to be towed, said connecting assemblies are held in place by a pivotal bolt for adjustment. Eger's tow bar is designed as a permanently assembled tow bar without any intention to alter or change it from on type of tow bar to another.

Lane's patent has a front coupler serving as a yoke for pivotal arms, on the rear end of said arms is a pivotal pin for adjustment and the attachment of shoe assembly which abuts up to a vehicle's bumper and bolts in place. Lane's tow bar is designed as a permanently assembled tow bar without any intention to alter or change it from one type of tow bar to another.

Milner's patent has a front coupler, a center bar, a u-shape yoke, a adjustable assembly for adjustment for a type of safety bar, tow bar arms, wherein, a bolt-pin holds an assembly that attaches said tow bar to a vehicle's front bumper, also, included is a chain means which is secured to the frame of the vehicle that is to be towed. Milner's tow bar is designed as a permanently assembled tow bar without any intention to alter or change it from one type to another.

Hoock's patent has a pair of clevis plates that serves as both a coupler and a yoke, there are two pivotal arms, wherein, on the rear of each arm is bolt-pins which hold bracketed assemblies for attachment to vehicle to be towed. Hoock's tow bar is designed as permanently assembled tow bar without any intention to alter or change it from one type of tow bar to another.

Pierce's patent has a coupler that, also, serves as a yoke to hold two nonpivotal diagonal linked arms, which are bolted together at the yoke part of said coupler, wherein, said bars are attached by removeable bolts for adjustment, thereafter, is a bolted clamping assembly at the end of said slide bars, for attachment to the vehicle to be towed. Pierce's tow bar is designed as a permanently assembled tow bar without any intention to alter or change it from one type of tow bar to another.

Safford's patent has a coupler on the front, which also, serves as a yoke, there are two arms extending rearwardly, also, there are abutting end plates welded to the rear end of each arm. Furthermore, there is a draw chain which attaches to the frame of the vehicle to be towed, wherein, there are tightening bolts to secure said tow bar to the vehicle to be towed. Safford's tow bar is designed as a permanently assembled tow bar without any intention to alter or change it from one type of tow bar to another.

Shattles's patent has a coupler that, also, serves as a yoke, two pivotal curved arms, a safety bar stationed between the permanently attached mounting assemblies, two links that serve as a forward safety bar, said mounting assemblies each have upper bumper hooks with a chain means and a lower bumper hook with a chain means for securing said assembly to the bumper on a vehicle to be towed, also, a right and a left safety chain that's secured between two vehicle. Shattles's tow bar is designed as a permanently assembled tow bar without any intention to alter or change it from one type of tow bar to another.

Woodke's patent has a front coupler that, also, serves as a yoke; two pivotal arms, which has a welded bumper pad assembly that abuts up to the bumper of the vehicle to be towed; there is a draw-chain means that attaches to the frame of the vehicle to be towed and a chain hook; a draw bolt and nut to tighten said draw chain, in order, to secure said welded bumper pad assembly tight to said vehicle's bumper, also, this tow bar includes a safety bar. Woodke's tow bar is designed as a permanently assembled tow bar without any intention to alter or change it from one type of tow bar to another.

Hawkins's patent has a front coupler that serves as a yoke, a center bar, two pivotal arms, on the rear of said arms are welded vertical bracket assemblies, said bracket assembly abuts up to the bumper, and is secured to the vehicle to be towed, whereby, two chain means attaches to said vehicle's frames, said chain means runs forward through a welded bracket on the sides of said tow bar arms, whereas, said chains are tightened, to secure said tow bar to said vehicle; another chain means is used on each arm over the top of each vertical bracket assembly to secure it to said bumper, additionally there is a pair of link members that serve as a safety bar. Hawkin's tow bar is designed as a permanently assembled tow bar without any intention to alter or change it from one type of tow bar to another.

Two of the foregoing patents references are not for a "Y" type of tow bar, rather they are as follows:

Green's patent has a bumper hitch which as a clamping assembly that clamps over a bumper, it has a lug extended rearward for connection to a draw bar, with a hole for a bolt to attach it to a draw bar. Green's hitch is one permanent design and is not designed as a way to make tow bars multi-interchangeable.

Labourdette tow bar has a coupler to attach it to a vehicle towing an other vehicle, there is a clamping assembly on a single draw bar for attaching it to said vehicle to be towed. There has not been any alternate attaching assemblies to said Labourdette draw bar.

In reference to prior art when considering the following patents. Eger, Lane, Milner, Hoock, Green, Pierce, Blachon (France), and Labourdette (France) have holes to bolt and attach an element thereto, these elements are the final contact point with towed vehicle. Thus, Eger's elements; ear, support rod, collar, ear', support rod' and collar'. Lane elements: tongue member, ears, draft bars, pivot pin, and apertures. Milners's elements: towing bar member, upper end shaft, and pin. Hoock's bolt-pins as it fits apertured connecting plates. Green elements: lug hole for bolt to attach to a draw bar. Pierce where bolt add on to the end of the tow bar. Labourdette element bolt in the swiveling bumper connector, wherein, each of these patents there is only one designed connector or connector assembly between the rear end of a draw bar or tow bar arms and the vehicle to be towed.

Each of the above patent's intent is only to use the holes and bolt-pins as a means to attach one designed connector or connector assembly and to allow for adjustment between draw bar or tow bar and vehicle to be towed.

The problems solved by the Multi-Interchangeable tow bar has been designed to include a new concept in the use of the holes and bolt-pins at the rear end of the tow bar arms, that is, to alternate with interchangeable connector assemblies between said tow bar arms and the vehicle to be towed, in order, to service each vehicle as designed, giving this invention a new and useful result. When in fact the Multi-Interchangeable Tow Bar is designed to change from one type of tow bar to another, without changing the basic part of said tow bar, but rather, changing only required connecting assemblies between said tow bar arms and a vehicle to be towed, to meet designed changes from one vehicle to another.

In the past patents for tow bar designs there has never been any attempt to make tow bars more useful by interchanging the parts that attach to the rear end of the tow bar arms and retaining the basic part of the tow bar, whereas, with the Multi-Interchangeable Tow Bar, there is a new concept of use, a course correction, wherein the past a person using a tow bar was required to change the whole tow bar, because of vehicle designs vary from one vehicle to another vehicle.

In this invention is a new concept of the use of tow bars that teaches and solves the problem of design changes by designing the tow bar as follows.

Where there is a basic tow bar without permanent connector assemblies that are used between the tow bar arms and the vehicle to be towed with the use of a center bar to be used as needed without permanent connector assemblies on it's rear end for an original interchangeable basic tow bar.

Clamping onto the bumper type tow bar is one that uses a clamping type of assemblies that clamps onto a vehicle's bumper, the clamping onto the bumper type tow bar, comprises of the basic tow bar and the selected component parts that make up a clamping type assembly with two safety bar.

Whereas, the Multi-Interchangeable basic tow bar is changed into abutment up to the bumper type tow bar by using bolt-pin holes and bolts to attach the connector assemblies that abuts up to a vehicle's bumper, for towing. This accomplished by attaching to center bar, a draw chain tightening hook attached to center brace, with said draw chain placed into said draw chain tightening hook, extending draw chain rearwardly longitudinal through lower draw chain holes in swivel vertical brace assemblies and under vehicle's bumper and attached to the frame of vehicle said draw chain is then tightened to secure said tow bar to vehicle for towing.

In further reference to prior art when considering the following patents: Safford, Shattle, et al, Woodke and Hawkins patented tow bars are of a type that has connector assemblies that abuts up to a vehicle's wherein, each patent is for a type of tow bar that has connector assemblies that are welded onto the rear end of said tow bar arms and all other clamps chains and draw chains are permanently placed there without any intent to change said tow bars into a different design.

A problem solved by the Multi-Interchangeable Tow Bar is through use of its adaptability to change from a tow bar abutment to bumper type, to a clamping to a bumper type of tow bar, said tow bar meets the need to adapt to change from one vehicle to another.

Shattle, Woodke, Safford, Hawkins and Milner show a chain means, wherein, each have used a chain means to draw their tow bars up to a vehicle to be towed. A chain means is used to attach the clamping assemblies or a safety chain as a draw chain in the abutment type of tow bar.

The Multi-Interchangeable Tow Bar has taken advantage of it's use of chain means in abutment up to bumper type of tow bar, in which, a draw chain is used to secure said tow bar to the vehicle to be towed.

SUMMARY OF THE INVENTION

The Multi-Interchangeable tow bar is a new teaching in the art, with a new concept in the way tow bars are designed and used, while it is a new combination of old elements there is a new and useful result.

In this concept of the invention, basic tow bar without any permanent connector ends on the rear end of the tow bar arms, comprises of a center bar with a coupler on the front, thereof a yoke with two pivotal arms, bolt holes in rear end of said arms are for attaching selective component connector ass mblies, and a bolt hole in the rear end of said center bar for attaching a center brace when needed.

There is a set of selective component parts to be used by choice, to complete one type of two bar or to alter to another type of tow bar.

Basic tow bar without any permanent connector ends on the rear end of the tow bar arms changes to a clamping onto the bumper type tow bar, by attaching a connector clamp onto bumper assemblies, to the rear end of said tow bar arms, and attaching the two safety bars.

Basic tow bar without any permanent connector ends on the rear end of the tow bar arms changes to abutment to the bumper type tow bar by; attaching vertical swivel brace assemblies to the rear end of tow bar arms and center brace to center bar, tightening hook, then said draw chain runs rearwardly longitudinal said arms through draw chain hole on the lower end of said vertical brace.

An object of this invention is to reduce the cost of using tow bars by reducing the cost of tow bar, inasmuch as, the purchase of a basic tow bar that has interchangeable connector assemblies, ergo, a saving will change in tow bar design. This change is accomplished with an advantage over all prior tow bars with new designed interchangeable connector assemblies.

An advantage the vertical swivel brace has over all other abutment to bumper vertical brace type of tow bar is that other abutment type tow bars have welded vertical braces and cannot be removed, additionally they cannot adjust, as much as, said vertical swivel brace can be adjusted from right to left in a straight or off set manner.

Another advantage the Multi-Interchangeable Tow Bar has over many of the other tow bars is; it was designed with a concept that gives it an interchangeable center bar to adapt to a draw chain type of tow bar as opposed to a bumper, albeit, some clamp onto bumper tow bars have center bar, there has not been any interchangeable parts designed to change them from one type of tow bar to another.

BRIEF DESCRIPTION OF THE DRAWINGS

FIGS. 1, 2, 3, and 4 of the Drawing show the basic tow bar of the interchangeable to bar, less permanently connected connector ends that attaches tow bar to vehicle to be towed. Designed to be adaptable, making it an interchangeable tow bar.

FIG. 1 is a side elevation view of basic "Y" configuration tow bar without any permanently connected interchangeable parts of the invention;

FIG. 2 is a top elevation view there of;

FIG. 3 is a fragmentary perspective view thereof;

FIGS. 5, 6, 7, 7a, 8, 9 and 10 of the Drawings show the basic tow bar adapted to make a clamping onto bumper type tow bar, attachable to certain automotive vehicle bumpers;

FIGS. 11, 12, 13, 14, 15, 16, 17, 18, 19, and 20 of the Drawing show the basic tow bar adapted to be a abutment to bumper type tow bar and by a different set of components. A tow bar that butts up against a automotive vehicle bumper to be used on certain types of vehicles;

FIG. 11 is a top elevation view of abutment to bumper type tow bar of the invention.

FIG. 12 is an exploded top elevation view of one of the arm assemblies there of;

DETAILED DESCRIPTION OF THE PREFERRED EMBODIMENTS

Referring now to the drawing in greater detail, and more particularly to FIGS. 1 through 4 thereof, these Figures show a basic tow bar without any permanently connector ends that is the final contact between tow bar an vehicle to be towed, which is, a Multi-Interchangeable Tow Bar, that can be adapted to an unlimited number of vehicles, according to the present invention.

The basic tow bar shown in FIGS. 1 through 4, can be altered into either a clamping onto bumper type tow bar, or an abutment up to bumper type tow bar so as to suit many different types of vehicles bumpers, on various designs and makes of automobiles This alternation is accomplished by replacing certain parts of one type tow bar with other separate parts, or else adding additional separate parts, in order, to form the other type of tow bar. Thus, the purchase of a single basic tow bar of this invention, along with a set of interchangeable or additional parts, eliminates the necessity of purchasing several different, completed permanently type tow bars, thus saving purchase cost for a user.

The basic tow bar comprises a center bar 1, which, at one end, is fitted with a coupler 1a, for connection to front vehicle. A longitudinally intermediate portion of the center bar is welded between a pair of upper and lower flat plate yokes 2. A left arm and right arm 3 are each fitted, at thier front ends, between the attached to the yokes by a bolt 4, passed therethrough. Each arm comprises a straight pipe 5, which, at opposite ends, is welded to a single-holed block 6, and a double-holed block 7, the single-holed block receiving the bolt 4.

It is to be noted, that a single bolt hole 8 is provided, along each arm pipe.

It is to be noted, that a single bolt hole 9 is utilized, along with center parts, when the basic tow bar is connected into the abutment up to bumper type tow bar.

Figures 1, 2, 3:
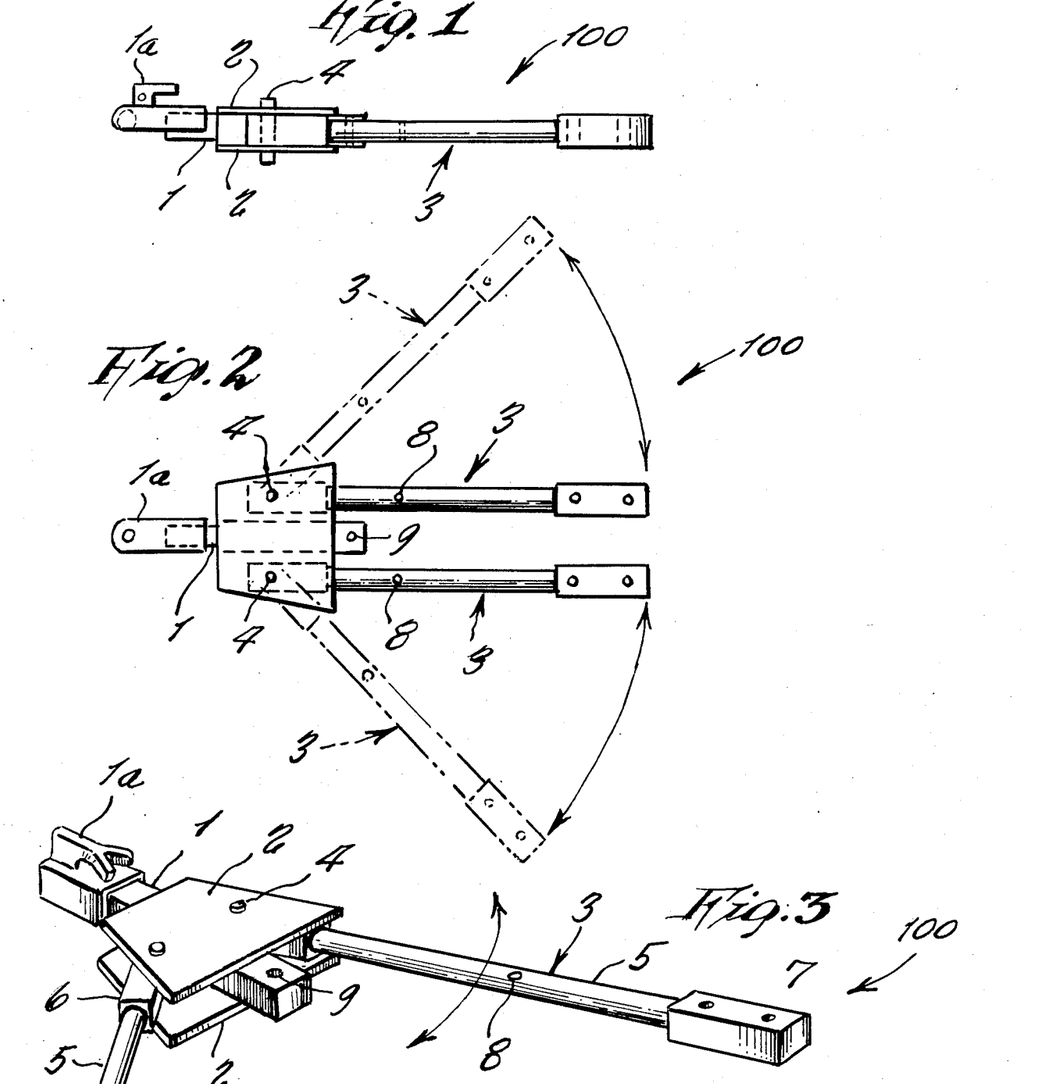
Figure 4:
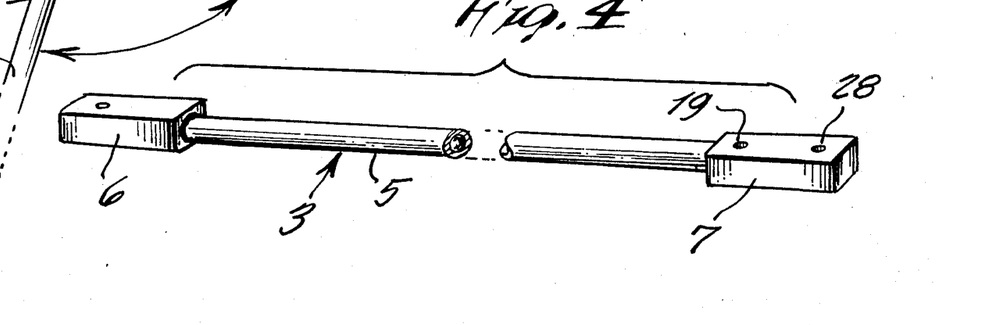
FIG. 4 is a perspective view of one of the arms shown in FIGS. 1 through 3.

In use of the basic tow bar the arms are each pivotally adjusted, as indicated by arrows 10 in FIG. 2, so that they fit different vehicles. Thereafter, the bolts 4 are tigthened, so that the arms are fixed at the selected angles, and the tow bar thus becomes a fixed tow bar.

In order to convert the basic tow bar to a clamping onto bumper type tow bar as shown in FIGS. 5 through 10, all the components of the basic tow bar are retained, and additionally, there are attached thereto a pair of safety bars 11 and 12, the safety bars being braced between the two arms. The safety bar 11 comprises a solid round bar 13, which, at each end, is welded to an angle iron 14, which has a series of bolt holes 15 near each each end of one flange thereof. A bolt 17, though a selected hole 15, and the hole 8 secures the safety bar 11 to each arm. A bolt 18, through a selected hole 16, and one of the holes 19, in the block 7, secures the safety bar 12 to each arm.

Figures 5, 6, 7, 7A, 8:
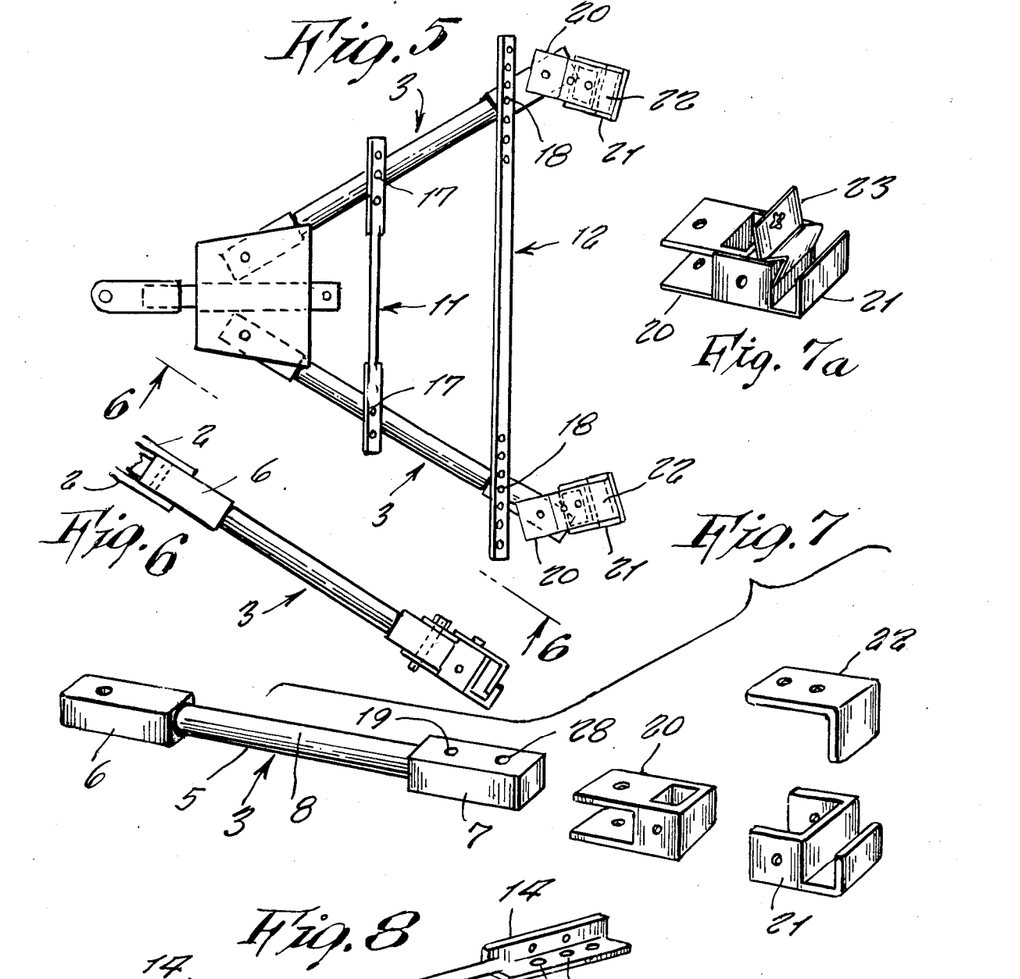
FIG. 5 is a top elevation view of basic tow bar as a clamping onto bumper type tow bar of the invention.
FIG. 6 is a side elevation view as viewed alone line 6—6 of FIG. 5.
FIG. 7 is an explode perspective view of one of the arms, and the components used, therewith, so as to form the assembly shown in FIGS. 5 and 6.
FIG. 7a is a perspective view of the same components as FIG. 7, with one component substituted for one of the components illustrated in FIG. 7 with the arm.
FIG. 8 is a perspective view of one of the safety bar.

Additionally, the clamping onto bumper type tow bar includes the attachment of other components on the end of each arm. These components, in one case, may comprise a variable swivel brace 20 with apertures, a pivotal lower jar 21 with apertures and an upper jaw 22 with two apertures (all shown in FIG. 7) to allow for a choice of widths of upper jaws 22 and lower jaws 21 in order, to secure tow bar to bumper of vehicle to be towed. Whereas, a clamping onto bumper type tow bar, as shown in FIGS. 5 and 6, is accomplished by assembling a connector assembly for each of the basic "Y" configuration two bar arms by connecting one each of the pivotal lower jaws 21 to one each of the interchangeable swivel braces 20 and by placing each of pivotal lower jaws 21's apertures over rear end of each swivel braces 20, in which, each have two pair of perpendicularly positioned bolt holes in which the rear two bolt holes of each swivel braces 20 are used to attach each pivotal lower jaws 21 and by placing bolts outward from inside of swivel braces 20's square hole, after which washers are placed onto bolts and nuts are screwed onto bolts, then after, apertures of each swivel braces 20 are placed onto each rear end of each tow bar arms and secured by placing bolts through bolt holes in rear end of each tow bar arms and bolt holes in each swivel braces 20's apertures, with washer placed onto bolts and nuts screwed onto bolts, then after, tow bar is placed up to bumper of vehicle to be towed and pivotal lower jaws 21 are placed underneath bumper then after one each of upper jaws 22 are hooked over top part of bumper and secured by long bolts that protrudes downward through a choice of one of upper jaws two apertures, with long bolts protruding downward through each of swivel braces 20's square hole where a large thick washer is placed onto each long bolt from bottom side of each swivel braces 20 and a nut screwed onto each long bolt and tightened till tow bar is secured to bumper. The brace 20 allows side-to-side adjustments, and the lower jaw 21 allows up- and down adjustments.

Figures 9, 10:
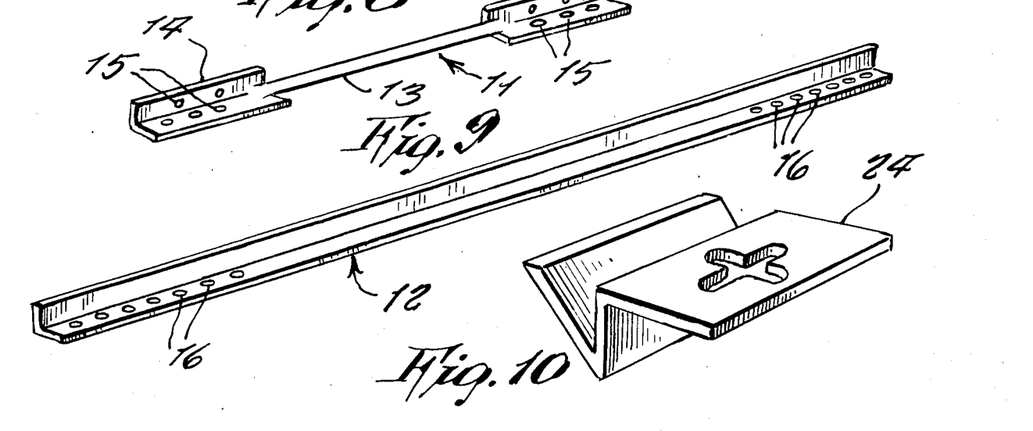
FIG. 9 is a perspective view of the other safety bar.
FIG. 10 is a perspective view of the same components shown in FIG. 7a that may be substituted for one of the components shown in FIG. 7.

These components may comprise the brace 20, the lower jaw 21 and an alternate upper jaw 23, as shown collectively in FIG. 7a and when a set of alternate upper jaws 23 is used the collective parts shown in 7a are used by attaching each of the swivel braces 20 and each of the pivotal lower jaws 21 in the same manner as when jaws 22 are used except each of the alternate jaws 23 replaces each of the jaws 22. And when pivotal lower jaws 21 are lowered underneath the bumper of the vehicle to be towed jaws 23 are hooked over top of said bumper then after a short chain with one end placed in chain slot in each of the upper jaws 23 (shown clearly in FIG. 10) with the other end of short chain extending downward through square hole at rear end of each swivel brace 20, thereafter a bolt is placed through lower end of each short chain with large thick washers (to block said chain from comming up through swivel brace 20's square hole) a nut is screwed on bolts where after the tow bar arms are placed up to bumper of vehicle to be towed and pivotal lower jaws 21 are lowered underneath the bumper and upper jaws 21 is placed over bumper where each short chain then is pulled upward in order to bring both pivotal lower jaws 21 tight with bumper and jaws 23 is pushed up tight to bumper and each short chain is pulled as taut as possible, then twisted in chain slots to lock in slots then after bolts on lower end of each short chain is tighten to secure tow bar to bumper. Jaw 24, shown in FIG. 10 is the same jaw, as jaw 23, shown in FIG. 7a. The particular selection of components to be used is determined by the particular shaped of the vehicle bumper to which they are to be attached. Some vehicles, like a Volkswagon or other small foreign sports cars, particularly, are very different from the heavy bumper of a large American car, such as, a Cadillac, Lincoln Continental, or the like.

The abutment to bumper type tow bar is assembled as shown in FIGS. 11 through 20. It includes all the components of the basic tow bar without any permanently attached connector ends. The safety bars 11 and 12 the clamping onto bumper type tow bar, and it additionally includes draw chain-attaching components shown in FIGS. 11 through 20 on the end of the center bar, as well as, on the ends of the arms that are not used in the other type of tow bar.

Figures 18, 19, 20:
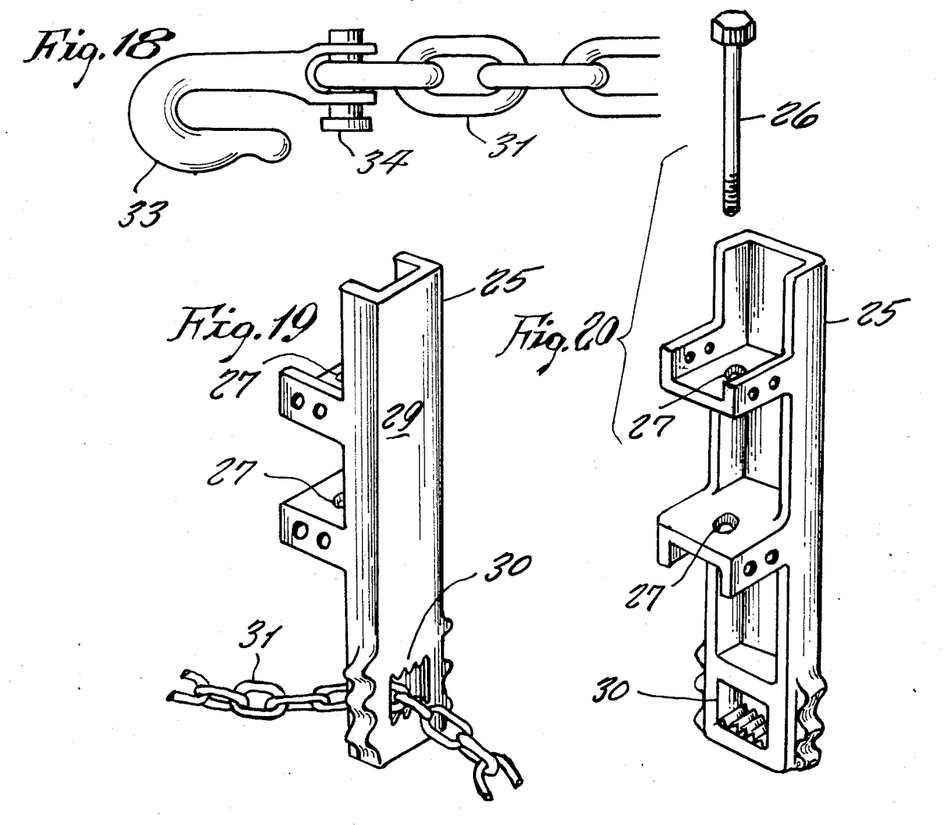
FIG. 18 is a side view of a portion of a draw chain which is shown in FIGS. 11 and 14.
FIG. 19 is a front perspective view of the interchangeable vertical swivel brace shown in FIG. 16.
FIG. 20 is a rear perspective view thereof.

Each interchangeable vertical swivel brace 25, shown in FIGS. 19 and 20, is attached with its apertures on an end of each arm, by means of a bolt 26, passed through a bolt hole 27 in the apertures of each of the vertical swivel braces 25, and through a bolt hole 28 on the arm so that each vertical swivel brace 25 is pivotable, in order, that a flat face 29 of each of the vertical swivel braces 25 bears flat against the vehicle's bumper. A rectangular opening 30, through a lower end of each of the vertical swivel braces, serves to receive a heavy, strong draw chain 31 therethrough. The chain then is extended underneath the vehicle to be towed, and hooked. The other part of the chain is placed in a draw chain tightening hook 40.

Figures 11, 12:
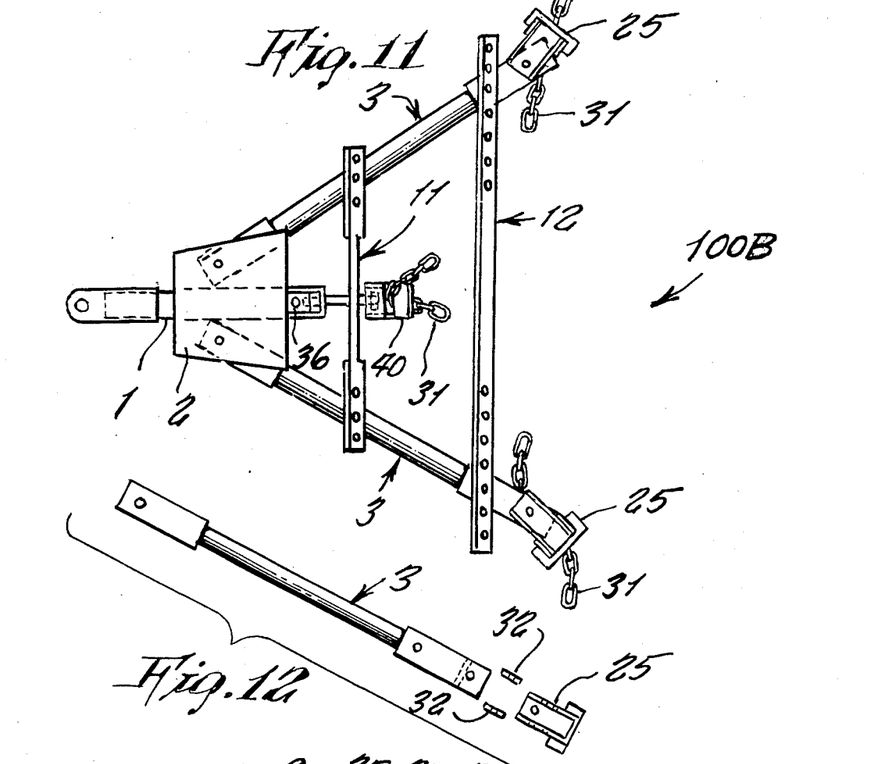
Figures 13, 14, 15, 16:
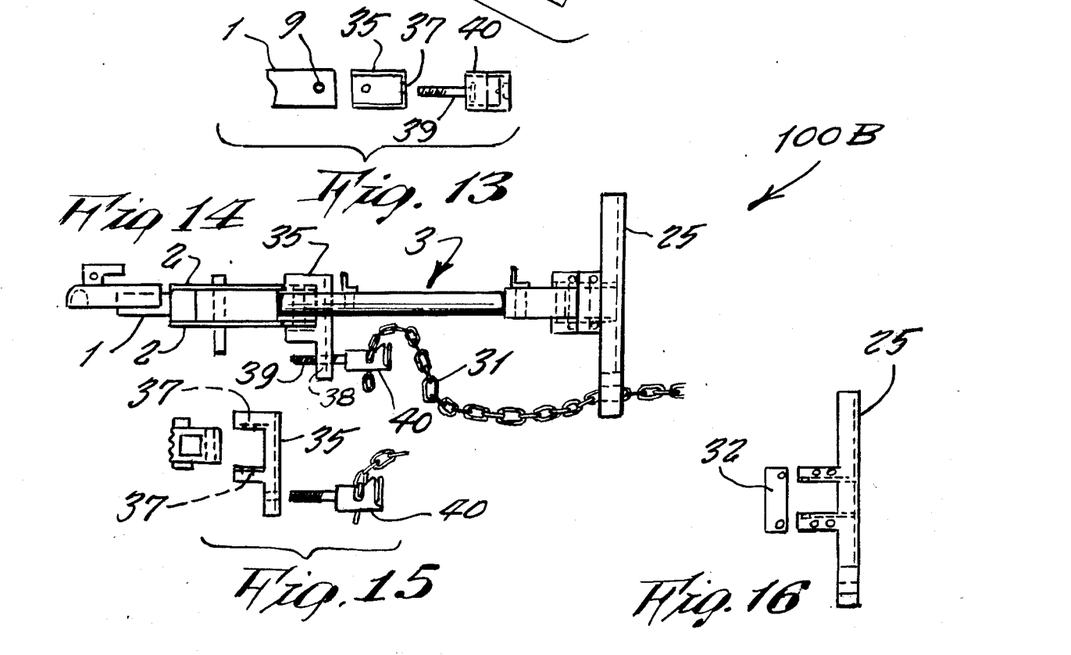
FIG. 13 is an exploded top elevation view of components attachable to the center bar.
FIG. 14 is a side elevation view of the abutment to bumper type tow bar as shown in FIG. 11.
FIG. 15 is an exploded side elevation view of the components attachable to the center bar.
FIG. 16 is a detailed side elevation view of a chain-receiving interchangeable vertical swivel brace and changeable plate shown in FIG. 11 an 14.
Figure 17:
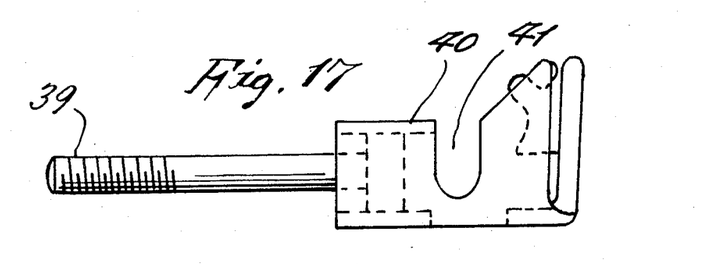
FIG. 17 is a side elevation view of a chain-receiving tightening hook that is supported from the center bar.

As shown in FIGS. 11 and 12, changeable plates 32 are to be used. for affixing each of the vertical swivel braces 25 relative to the rear end of the basic tow bar arms, and the bumper of the vehicle to be towed.

A hook 33 has a clevis pin 34, for attachment on an end of the draw chain.

A center brace 35 with apertures that is generally quite similar in appearance to vertical swivel braces 25, is attached on an end of the center bar 1, by means of a bolt 36, passed through upper and lower bolt holes 37 in the center brace apertures, and also through the bolt hole 9 in the center bar, so that the center brace thus becomes a fixed brace. A non-threaded hole 38, on the lower portion of center brace 35, receives a threaded shank 39 of the draw chain tightening hook 40, having a notch 41, for receiving an intermediate portion of the draw chain. The chain 31 is pulled tight therein, pulling the vertical swivel braces 25 tightly to the vehicle bumper.

Thus, in abutment to bumper type tow bar, shown in FIGS. 11, 12, 14, 15, 16, 17, 18, 19 and 20 of the drawings a chain means are included in the use tow bar.

Now I claim:

1. A Multi-Interchangeable Tow Bar that is used to tow one vehicle behind another, in which, a basic "Y" configuration tow bar is used comprising a front coupler at a front end of a center bar, which is, used to connect said tow bar with a towing vehicle, said front coupler is on said front end of said center bar that is welded between two plates to form a yoke, wherein, two pivotal arms are engaged between said two plates of said yoke with bolts through bolt holes in said yoke and through bolt holes at said front end of said arms then after washers are placed on bolts and nuts are screwed onto bolts to secure said arms to said yoke, wherein, said arms have bolt holes in intermediate portion to receive bolts to secure a forward safety bar, moreover, in rearward portions of said arms are bolt holes to receive bolts to secure a rearward safety bar to said tow bar arms whereas, on rear end of said arms are bolt holes to receive bolts and multi-interchangeable connector assemblies which are the final contact part of said tow bar with vehicle to be towed; whereas, said basic "Y" configuration of said tow bar is without any permanently connected parts attached to rear end of said center bar, without permanently connected chains, without any permanently attached connector assemblies, and without any permanently connected parts on rear end of said tow bar arms at the point where connector parts connect said tow bar to said vehicle to be towed:

A. wherein, the improvement comprises in combination of said basic "Y" configuration of said tow bar without any permanently connector parts on rear end of said tow bar arms and a plurality of selective components parts that can be assembled into said multi-interchangeable connector assemblies that can change said basic "Y" configuration of said tow bar into different types of tow bars:

B. whereas, a clamping onto bumper type tow bar is accomplished by assembling a connector assembly for each of said basic tow bar arms, by connecting each of pivotal lower jaws to each of interchangeable swivel braces in which said swivel braces have two pair of perpendicularly positioned bolt holes in which the rear two bolts holes of said swivel braces are used to attach each of the pivotal lower jaws to said swivel braces by placing bolts through bolt holes in said lower jaw's apertures and said swivel braces rear bolt holes with washers placed on bolts and nuts screwed onto bolts, then after, apertures of each said swivel braces are placed onto rear end of said basic tow bar arms and secured by placing bolts through bolt holes in rear end of said basic tow bar arms and bolt holes in said swivel braces apertures with washers placed onto bolts and nuts screwed onto bolts then after one set of type of upper jaws is chosen, and secured to said lower jaws when said tow bar is connected to a vehicle to be towed, whereas, long bolts, washers and nuts are used to secure one set of upper jaws to said lower jaws and when another set of alternate upper jaws are chosen, a short chain bolts, washers and nuts are used to secure said alternate upper jaws, then after a safety chain is used connected between front and rear vehicle:

C. whereas said basic "Y" configuration of said tow bar can be changed into an abutment up to bumper type of tow bar by, removing said connector assemblies if any attached to rear end of said tow bar arms and by selecting each of the interchangeable vertical swivel braces one for each said basic tow bar arms and attaching one changeable plate onto each side of each of said vertical swivel braces, with bolts through bolt holes on each side of said vertical swivel braces apertures, then after, washers are placed onto bolts and nuts screwed onto bolts which secures said changeable plates to said vertical swivel braces for allowance of adjustment of said vertical swivel braces; then after, each said vertical swivel braces apertures are placed onto rear end of said basic tow bar arms, wherein, bolts are placed through bolt holes in apertures and rear end of said tow bar arms to secure said assemblies to said basic tow bar, then washers are placed onto bolts and nuts are screwed onto bolts wherein, a center brace with apertures is placed onto rear end of said center bar by placing said center brace apertures over the rear end of said center bar in which bolts are placed through the bolt holes in said center bar and bolt holes in said center brace apertures to secure said center brace to said basic tow bar then after, washers are placed onto bolts with nuts screwed onto bolts; following this is a draw chain tightening hook's bolt shaft end is placed into a bolt hole on the lower end of said center brace then a washer and nut are placed onto bolted shaft of said tightening hook; then after, a draw chain is placed longitudinal said tow bar arms and through chain hole at lower end of each said vertical swivel braces to be attached to the underneath side of said vehicle to be towed when securing said tow bar to rear of said vehicle then after the middle of said draw chain is placed into hole on said draw chain tightening hook to pull said tow bar tight up to said vehicle's bumper to be towed, then after, said draw chain's tightening hook's nut is screwed up tight.

* * * * *